United States Patent
Haven

(10) Patent No.: US 7,182,468 B1
(45) Date of Patent: Feb. 27, 2007

(54) DUAL LAMP ILLUMINATION SYSTEM USING MULTIPLE INTEGRATOR RODS

(75) Inventor: Thomas J. Haven, Portland, OR (US)

(73) Assignee: Delta Electronics, Inc. (TW)

( * ) Notice: Subject to any disclaimer, the term of this patent is extended or adjusted under 35 U.S.C. 154(b) by 218 days.

(21) Appl. No.: 10/863,296

(22) Filed: Jun. 7, 2004

(51) Int. Cl.
*G03B 21/26* (2006.01)
*G03B 21/14* (2006.01)
*G03B 21/28* (2006.01)
*G03B 21/00* (2006.01)

(52) U.S. Cl. .......................... 353/94; 353/37; 353/97; 353/98; 353/99; 353/121

(58) Field of Classification Search .................. 353/20, 353/34, 37, 84, 97, 98, 99, 122, 121; 359/889–892
See application file for complete search history.

(56) References Cited

U.S. PATENT DOCUMENTS

| | | | |
|---|---|---|---|
| 5,706,376 A | 1/1998 | Rykowski et al. | 385/31 |
| 5,844,638 A * | 12/1998 | Ooi et al. | 349/10 |
| 6,183,093 B1 | 2/2001 | Sawai | 353/31 |
| 6,196,699 B1 | 3/2001 | Stanton | 362/235 |
| 6,341,876 B1 | 1/2002 | Moss et al. | 362/268 |
| 6,499,863 B2 | 12/2002 | Dewald | 362/268 |
| 6,505,939 B1 * | 1/2003 | Bierhuizen et al. | 353/94 |
| 6,513,937 B1 * | 2/2003 | Dehmlow | 353/94 |
| 6,545,814 B2 | 4/2003 | Bartlett et al. | 359/636 |
| 6,793,345 B2 * | 9/2004 | Dho | 353/94 |
| 2005/0013142 A1 * | 1/2005 | Andersen et al. | 362/583 |

* cited by examiner

*Primary Examiner*—Melissa Jan Koval
(74) *Attorney, Agent, or Firm*—Patent Law Group LLP; Carmen C. Cook

(57) ABSTRACT

An illumination system includes a first light source, a second light source, a first light integrating device and a second light integrating device. Each light integrating device includes an input aperture at an input end for receiving input light and a turning mirror at an output end for reflecting light onto an output aperture where the output aperture is positioned in a direction perpendicular to the input aperture. The illumination system further includes a first reflective mirror and a second reflective mirror each coupled to direct light from the respective light source into the input aperture of the respective light integrating device. The illumination system includes a third light integrating device including an input aperture optically coupled to the output apertures of the first and second light integrating devices. The input aperture of the third light integrating device receives light collected by the first and second light integrating devices.

22 Claims, 3 Drawing Sheets

DUAL LAMP ILLUMINATION SYSTEM USING MULTIPLE INTEGRATOR RODS

FIELD OF THE INVENTION

The invention relates to illumination systems and, in particular, to an illumination system for a projection system using two light sources and three integrator rods for improved light collection.

DESCRIPTION OF THE RELATED ART

Data projectors, also known as digital projectors, are used for projecting images, usually color images, onto a screen. These projectors generally employ one of two types of data projection technologies. First, there are projectors using liquid crystal display (LCD) panels that act as the image forming device. Second, there are projectors using reflective digital micromirror device (DMD) chips. DMD chips are silicon based chips having movable microelectromechanical mirrors constructed thereon that act as the image forming device. The latter type of projectors is sometimes referred to as DMD projectors or digital light processing (DLP) projectors.

DLP projectors using a single DMD panel or multiple DMD panels are known. A critical operating parameter for these types of projectors is the maximum brightness level of the projectors. To provide satisfactorily bright output images, the projector must incorporate an illumination system including a bright light source and with good light collection efficiency so that the illumination system can deliver a light beam with a sufficiently high brightness level.

A typical illumination system includes three major optical elements: a) a light source or a lamp for providing a source of light, b) a light integrator to homogenize the light and c) a set of relay optics. The light source can be a UHP (ultra high pressure) lamp with an elliptical or parabolic reflector or a high power xenon arc lamp. The light integrator can be a rod, either solid glass or a mirrored tunnel. The light integrator can also be a pair of lens arrays. In both cases the purpose of the light integrators is to take a circularly symmetric light distribution produced by the lamp and convert it into a uniformly illuminated rectangular pattern. This is easily visualized in the case of the rectangular integrator rod where the input to the rod is a circular spot produced by the lamp and the output of the rod is a uniformly illuminated rectangular aperture. The third component in the illumination systems is the relay optics which may include one or more converging or diverging lenses used for relaying the output aperture of the integrating rod and focusing and in some cases magnifying the output light from the integrating rod on to the imaging panel, either the DMD or LCD devices.

To improve viewability of the display images in high ambient lighting conditions, projectors often demand an increasingly higher brightness level from the illumination system. However, conventional UHP mercury lamps with small arc gaps have limited power for a variety of reasons. Therefore, it is often not feasible to increase the light output of an illumination system by using a single lamp. Illumination systems using two lamps to double the brightness of the light beam have been proposed. U.S. Pat. No. 6,341,876 to Moss and U.S. Pat. No. 6,183,093 to Sawai disclose exemplary dual lamp illumination systems. In Moss, light from two light sources are directed to an integrator rod through a pair of prisms. In Sawai, two lamps are configured at an incline angle to direct all the light output towards a light distributor.

The conventional dual lamp illumination systems have many shortcomings. One major shortcoming is that in the conventional dual lamp systems, using two lamps never doubles the brightness level. This is because the physical law of optics limits the amount of light that can be collected and imaged onto a display panel or a reflective chip. Basically, the law of optics dictates that the product of the area of an aperture times the solid cone angle of the input light is a constant throughout the optics of the system. In other words, the product of the input aperture area and the input cone angle has to be the same as the product of the output aperture area and the output cone angle. For example, if the input aperture of an illumination system is 4.8×6.4 mm, the input cone angle is 28 degrees and the output aperture is 2.4× larger than the input aperture, then the output cone angle will be about 11 degrees, 2.4× smaller than the input cone angle. That is, if the output aperture has to be magnified as compared to the input aperture, then the size of the output cone angle is limited. It should be noted that if the limiting acceptance angle of the imaging device is 11 degrees, then any light falling outside this cone angle at the panel cannot be used. This implies that at the input side of the illumination system, light falling outside the input cone angle of 28 degrees also cannot be used.

In the above example, the 28 degree cone angle for the elliptical light source was not arbitrary. 28 to 32 degree output cone angles from UHP lamps are very typical of elliptical reflectors used in these lamps. There are many reasons for choosing this type of reflector but some of the reasons are for limiting the reflector size, limiting the path length of the total relay system and the relative ease of cooling important components that make up a lamp such as the quartz bulb and wire leads.

Furthermore, in some conventional dual lamp solutions such as that proposed by Sawai, a portion of the reflector of each lamp has to be cut off in order for the two lamps to be put physically close enough for the light to reach the integration rod. Without cutting away a portion of the reflectors, the lamps have to be pivoted about the collecting aperture and the total light input angles would increase. Because typical projector panels cannot accept a large input cone angle (output cone angle of the illumination system), increasing the light input angle to the illumination system is not desirable. For instance, some projector systems limit the output angle of the illumination system to about 11 degrees because of the properties of the display panel. So even by cutting a portion of the reflector away it is still not possible to completely eliminate an increase in the light input angle to the integration rod so as to accommodate two lamps. Although this leads to an increase in the total light collected in the rod, much of the light is still unusable at the display panel and is therefore a reduction in system efficiency. In addition, the system loss due to the larger cone angles described above does not include the loss due to cutting away a portion of the reflector. In summary, typical light collection efficiencies with cut reflectors is only about 1.4× that of a single lamp system.

In the two-lamp full reflector method described by Moss, the 28 to 32 degree cone angles of typical elliptical reflectors also creates a limiting light collection problem. The large cone angle of the lamp prevents total internal reflection in the input prism for a large portion of the light. Also, even if the cone angle of the input light is somehow reduced, either by lensing or by construction of a new reflector or by a parabolic reflector and a condensing lens, then the focused spot would be too large for the apertures typically used for DMD panels and many LCD panels. Hence, the system proposed by Moss would again have severe inefficiencies.

It is desirable to provide a dual lamp illumination system with increased brightness for use with a digital projection system. It is further desirable to provide a dual lamp illumination system that can overcome the shortcomings of the conventional dual lamp solutions.

SUMMARY OF THE INVENTION

According to one embodiment of the present invention, an illumination system includes a first light source, a second light source, a first light integrating device and a second light integrating device. Each light integrating device includes an input aperture at an input end for receiving input light and a turning mirror at an output end for reflecting light in the light integrating device onto an output aperture where the output aperture is positioned in a direction perpendicular to the input aperture. The first light integrating device receives input light from the first light source while the second light integrating device receives input light from the second light source. The illumination system further includes a third light integrating device including an input aperture at an input end where the input aperture is optically coupled to the output apertures of the first and second light integrating devices. The input aperture of the third light integrating device receives light collected by the first and second light integrating devices. The third light integrating device provides light output at an output aperture.

In an alternate embodiment, the illumination system further includes a first reflective mirror coupled to direct the light from the first light source into the input aperture of the first light integrating device and a second reflective mirror coupled to direct the light from the second light source into the input aperture of the second light integrating device.

According to another aspect of the present invention, an illumination system includes a first light source, a second light source, a first light integrating device and a second light integrating device. The first light integrating device includes an input aperture at an input end for receiving input light from the first light source and a turning mirror at an output end for reflecting light in the light integrating device onto an output aperture where the output aperture is positioned in a direction perpendicular to the input aperture. The second light integrating device includes an input aperture at an input end where the input aperture is optically coupled to the output aperture of the first light integrating device for receiving light collected by the first light integrating device. The input aperture of the second light integrating device is also optically coupled to receive input light from the second light source. The second light integrating device provides light output at an output aperture.

The present invention is better understood upon consideration of the detailed description below and the accompanying drawings.

DETAILED DESCRIPTION OF THE PREFERRED EMBODIMENTS

In accordance with the principles of the present invention, an illumination system for use in a projection system, such as a digital projector, includes first and second light sources and a three-rod light integration system for collecting and combining light from the two light sources to provide a substantially uniform light output with high brightness. The three-rod light integration system includes a first light integrating device for collecting light from the first light source and a second light integrating device for collecting light from the second light source. A turning mirror at the output end of each of the first and second light integrating devices directs the light collected from the respective light sources into a third light integrating device. In this manner, the three-rod integrator system functions as a highly efficient light collection system by maintaining a short focal length from the lamps that keeps the spot size small and enables the implementation of a dual lamp configuration for increased brightness in a compact physical footprint.

In an alternate embodiment, the three-rod integrator system can be implemented as a two-rod integrator system where only a first light integrating device collects light from the first light source and direct the collected light into the second, main light integrating device. The first light integrating device is positioned to consume only a portion, such as a half, of the input aperture of the second, main light integrating device. The light from the second light source is directed directly at to the remaining portion of the input aperture of the second, main light integrating device. In this manner, the main light integrating device can be used to collect light from two light sources efficiently.

The illumination system of the present invention has particular application in a dual lamp DMD projector for providing a source of bright and uniform light beam for the image forming reflective chip of the projector. However, the illumination system has general application in any imaging devices where a light beam with high brightness and uniformity is desired and where high collection efficiency is important.

Figure 1:
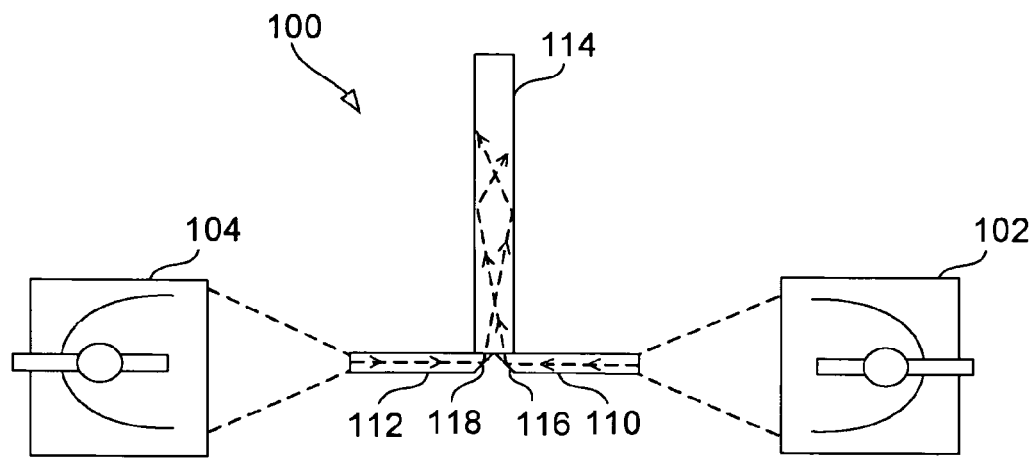
FIG. 1 is a schematic diagram illustrating the illumination system according to one embodiment of the present invention.

FIG. 1 is a schematic diagram illustrating the illumination system according to one embodiment of the present invention. Referring to FIG. 1, illumination system 100 includes a first light source 102 and a second light source 104. First light source 102 and second light source 104 can each be an UHP lamp or other high power light source. In the present embodiment, each of the light sources is implemented as a high power lamp housed in an elliptical reflector. An elliptical reflector has advantages over parabolic reflectors in that a small spot size can be achieved without using a condenser lens. In other embodiments, other light sources that are capable of providing a small spot size can also be used. First and second light sources can be identical in power levels or can provide different power levels. The power level of each of the light sources is selected so that the sum of the light output from the light sources provides the desired final brightness level. In the present embodiment, light source 102 and light source 104 are implemented as 250 W watt, 1.3 mm or 1.0 mm arc UHP lamps in an elliptical reflector.

In the present embodiment, first light source 102 is positioned to direct its output light into an input aperture of a first light integrating device 110, also referred herein as the first integrator rod or the first feeder rod. On the other hand, second light source 104 is positioned to direct its output light into an input aperture of a second light integrating device 112, also referred herein as the second integrator rod or the second feeder rod. First and second light sources 102 and 104 provide light with a cone angle optimized for collection by first and second feeder rods 110 and 112.

Illumination system 100 uses a three-rod light integration system to combine light from first light source 102 and second light source 104 to generate a highly uniform output light beam having a high brightness level. In the present embodiment, the three-rod light integration system includes first integrator rod 110 and second integrator rod 112 arranged linearly on the same axis and a third integrator rod 114 arranged in perpendicular alignment with the first and second integrator rods. First and second integrator rods 110, 112 function as feeder rods for reaching out to the respective light source and collecting light from the respective light source. In this manner, the two light sources can be positioned apart from each other and no cutting of the reflector is required to implement a dual lamp system. Third integrator rod 114, also referred to as the primary integrator rod or the main collector rod, functions as the final light integrating device for collecting and combining light output from the first and second integrator rods.

First integrator rod 110 includes an input aperture at an input end receiving the light output from light source 102. First integrator rod 110 also includes a turning mirror 116 at an output end. The turning mirror forms a turning surface for turning the light collected in the first integrator rod at a right angle into an output aperture. Similarly, second integrator rod 112 includes an input aperture at an input end receiving the light output from light source 104. Second integrator rod 112 also includes a turning mirror 118 at an output end which functions as a turning surface for turning the light collected in the second integrator rod at a right angle into an output aperture. Thus, the output aperture of each feeder integrator rod is positioned in a direction perpendicular to the input aperture.

In the present embodiment, the turning mirror is a "normal" mirror placed at a 45° angle with respect to the output aperture at the output end of the integrator rod. In the present description, a "normal" mirror refers to a mirror with greater than 98% reflectance and is typically made of metal. Thus, in one embodiment, the turning mirrors in first and second integrator rods 110 and 112 are formed as metal mirrors. The turning surface should be highly polished to increase the reflectivity. In one embodiment, a high index dielectric coating where the index of refraction n is greater than 2.13 can be deposited on the turning surface. In this manner, the turning mirrors can essentially function as a 100% reflectance mirrors for light from a lamp having a given input cone angle, thereby achieving total internal reflection. For instance, an optimized input cone angle is about 28 degrees.

In the present embodiment, the output end of the first integrator rod abuts the output end of the second integrator rod. The output apertures of the first and second integrator rods are coupled to the input aperture of third integrator rod 114 so that light collected by the first and second integrator rods is directed into the primary integrator rod. Primary integrator rod 114 combines the light from the first and second integrator rods and homogenizes the combined light as the light travels down the integrator rod. Primary integrator rod 114 generates an output light beam that is highly uniform and has a high brightness level being substantially the sum of the two input light sources.

Figure 2A:
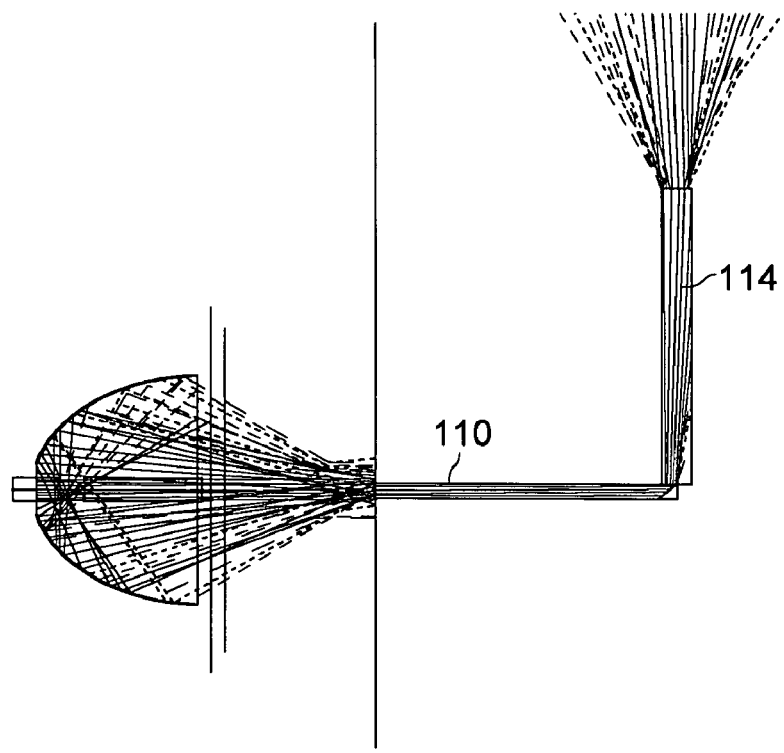
FIGS. 2A and 2B are simulation plots modeling the behavior of the light as the light collected in the feeder integrator rod is turned by the turning mirror and redirected into the main collector integrator rod.
Figure 2B:
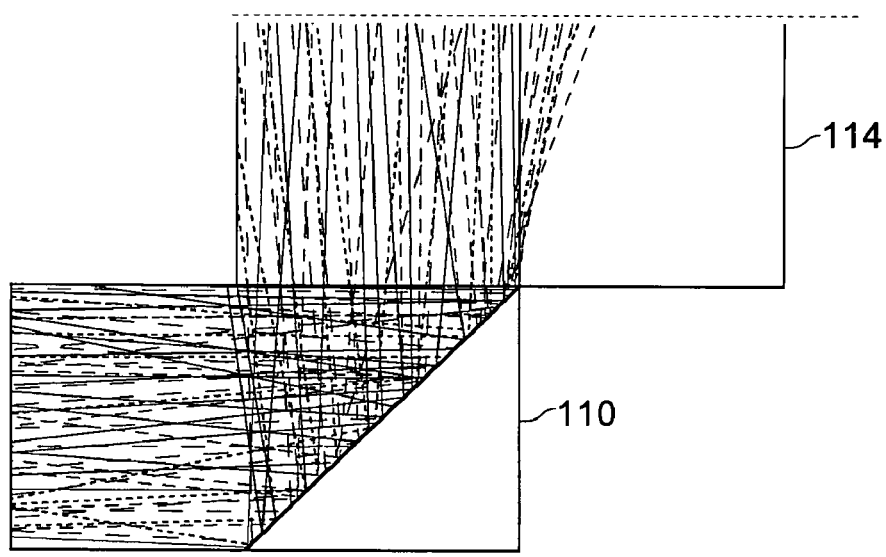

FIGS. 2A and 2B are simulation plots modeling the behavior of the light as the light collected in the feeder integrator rod is turned by the turning mirror and redirected into the primary integrator rod. In FIG. 2A, the modeling is performed for a single light source directing light into a single feeder integrator rod, denoted as integrator rod 110, which is coupled to primary integrator rod 114. The turning mirror at the output end of integrator rod 110 turns the light into primary integrator rod 114. FIG. 2B is an exploded view of the output end of integrator rod 110 illustrating the turning of the light from integrator rod 110 into primary integrator rod 114. In actual implementation, another feeder integrator rod will be coupled to primary integrator rod 114 to direct light from a second light source into the other half of primary integrator rod 114. Alternately, light from the second light source can be directed directly into primary integrator rod 114 without the use of a second feeder integrator rod.

Illumination system 100 of the present invention is particularly useful when the input aperture of the primary integrator rod is limited to meet the system requirement for small output cone angle and for fixed system magnification. For instance, a system magnification of 2.4 may be used so that the output aperture of the illumination system is 2.4× larger than the input aperture. Thus, once the magnification of the system is established, the input aperture size for the light collection device becomes fixed. Conventional dual lamp techniques generally work poorly and are very inefficient when the illumination system demands a small input aperture size. In accordance with the present invention, since the two feeder rods need to share the input aperture of the primary collector rod, each feeder rod can have an output aperture size about half the input aperture area of the primary integrator rod. By using the feeder rods to collect light from the light source, the main integrator rod can maintain a small aperture size to meet the output aperture size and system magnification requirements.

When a small input aperture is used, it is also important to use light sources with a small spot size to ensure that most of the light from the light sources can be collected. The small spot size requirement leads to the use of lamps with a short working distance where working distance refers to the distance from the lamp output face to the focal point. However, a short working distance for a lamp implies a large input cone angle of light. In accordance with the present invention, the first and second feeder rods have an optimally sized input cone angle for receiving the input light from the respective light source so that the illumination system can operate with lamps having short working distance and a small spot size. The illumination system of the present invention can enhance light collection efficiency.

ALTERNATE EMBODIMENTS

FIG. 1 illustrates one physical arrangement of illumination system 100 of the present invention. However, the particular physical arrangement of illumination system 100 in FIG. 1 is illustrative only and is not intended to be limiting. Specifically, while the illumination system of the present invention requires the primary integrator rod and the secondary integrator rods to be in perpendicular arrangement, the light sources can be positioned in other suitable arrangement for achieving the desired system parameters.

For example, when compact system size is critical, the light sources can be arranged in a manner suitable to reduce the size of the overall system.

Figure 3:
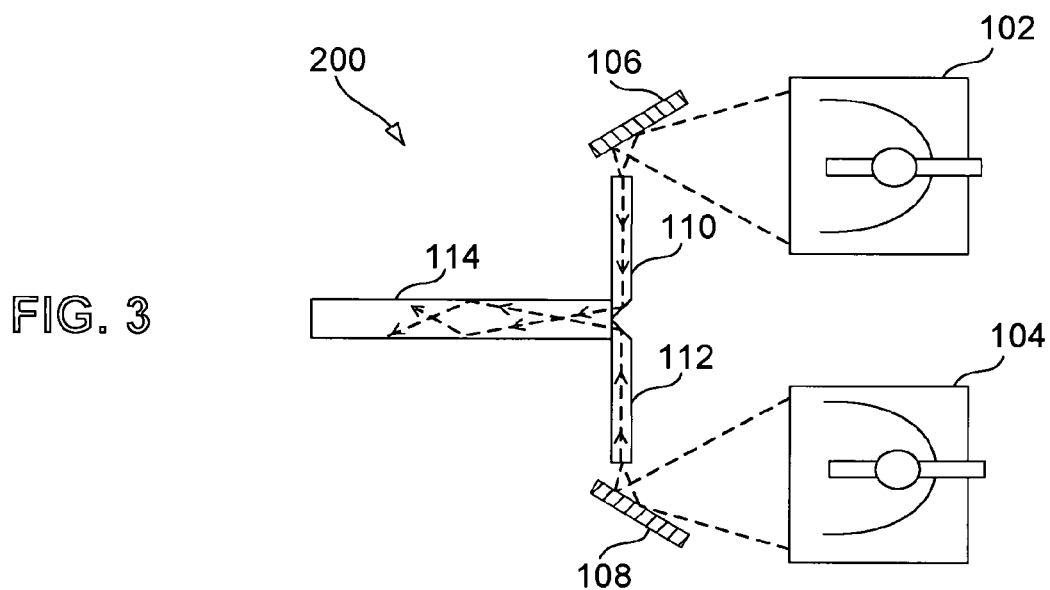
FIG. 3 is a schematic diagram illustrating the illumination system according to a first alternate embodiment of the present invention.

FIG. 3 is a schematic diagram illustrating the illumination system according to a first alternate embodiment of the present invention. Like elements in FIGS. 1 and 3 are given like reference numerals to simplify the discussion. In illumination system 200 of FIG. 3, first and second light sources 102 and 104 are positioned adjacent each other to achieve a compact system size. In the embodiment shown in FIG. 3, reflective mirrors are used and are positioned accordingly to direct the light output from the light sources into the three-rod light integration system. Specifically, illumination system 200 includes a pair of mirrors 106, 108 for receiving the light output from light sources 102, 104. In the present embodiment, mirrors 106 and 108 are UV/IR cold mirrors having a reflectivity greater than 98% for visible light but is transmissive to both UV light (less than 400 nm) and IR light (greater than 800 nm). Mirror 106 is positioned in the optical path of first light source 102 and operates to reflect the light output from light source 102 onto the input aperture of first light integrating device 110. Mirror 108 is positioned in the optical path of second light source 104 and operates to reflect the light output from light source 104 onto an input aperture of second light integrating device 112. Mirror 106 and mirror 108 are positioned in a manner so as to ensure that the input cone angle for the reflected light is perpendicular to the input aperture of the respective feeder rod.

In FIG. 3, light integrating devices 110 and 112 are shown to have the same length. In other embodiments, the length of light integrating devices 110 and 112 can be different so that light sources 102 and 104 can be placed closer together to minimize the overall system height. For example, an integrator rod for implementing light integrating device 112 can be made shorter than an integrator rod implementing light integrating device 110. Thus, light source 104 can be positioned in closer proximity to light source 102.

Figure 4:
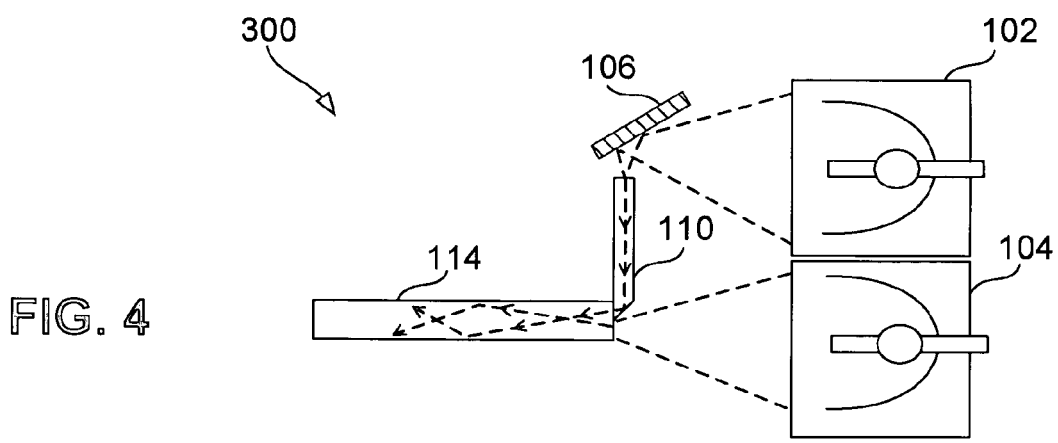
FIG. 4 is a schematic diagram illustrating the illumination system according to a second alternate embodiment of the present invention.

FIG. 4 is a schematic diagram illustrating the illumination system according to a second alternate embodiment of the present invention. Like elements in FIGS. 3 and 4 are given like reference numerals to simplify the discussion. In the embodiment shown in FIG. 4, illumination system 300 uses a single feeder rod 110. The output aperture of feeder rod 110 is coupled to only a portion of the input aperture of main integrator rod 114 while the remaining portion of the input aperture of main integrator rod 114 remains exposed. While light from first light source 102 is reflected by mirror 106 into first integrator rod 110, light from second light source 104 is directed directly at the exposed input aperture of main integrator rod 114. Main integrator rod 114 sums the light from first and second light sources and homogenizes the light to provide a uniform light output. By eliminating the second feeder rod, illumination system 300 of FIG. 4 achieves a further size reduction as first and second light sources can be placed closer to each other.

Figure 5:
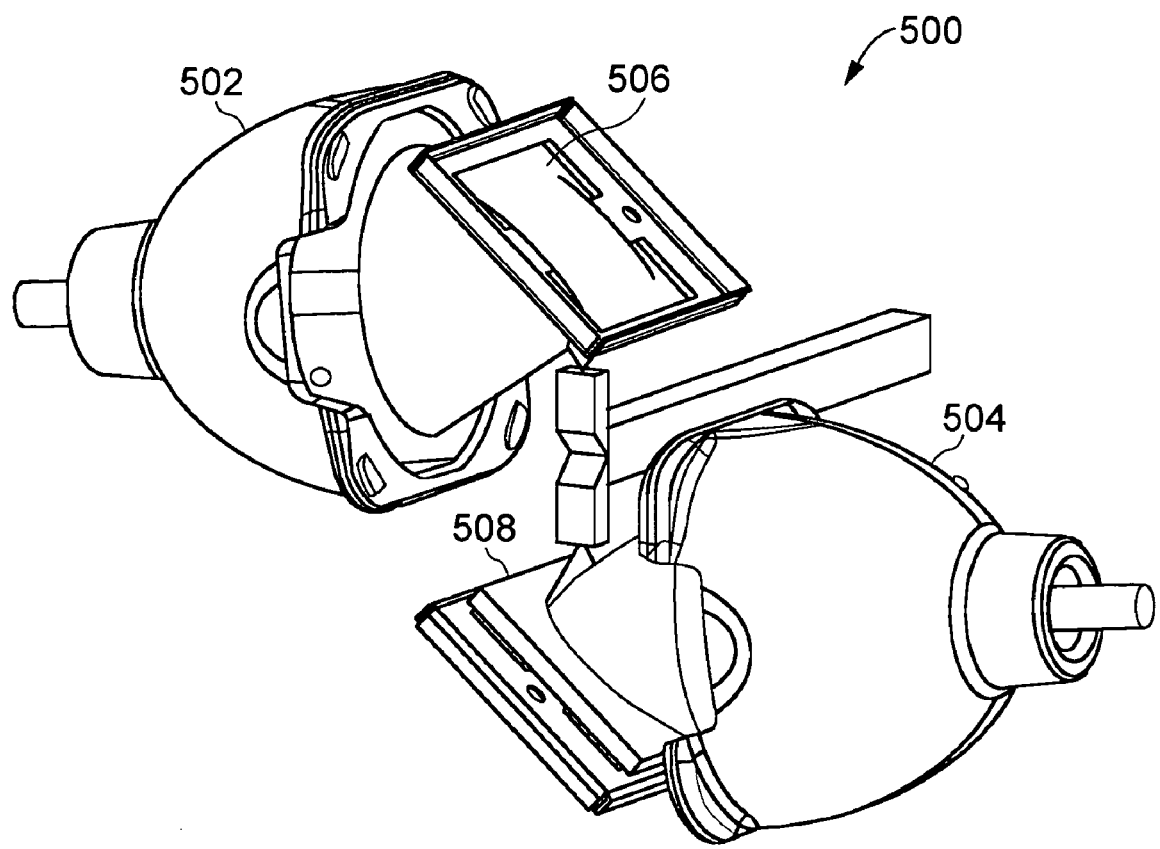
FIG. 5 illustrates a third alternate embodiment of the illumination system of the present invention.

FIG. 5 illustrates a third alternate embodiment of the illumination system of the present invention further illustrating how the positioning of the light sources can be modified to meet different end system requirements. FIG. 5 is a three-dimensional view of an illumination system 500. In FIG. 5, light sources 502 and 504 are positioned on opposite sides of the secondary integrator rods. Mirrors 506 and 508 (shown mounted on brackets) direct light from the respective light source into the secondary integrator rods. The output ends of the secondary integrator rods are coupled to the primary integrator rod for directing the collected light into the primary integrator rod. The arrangement in FIG. 5 is particularly useful when reduction in system height is desired. By placing the two light sources on opposite sides of the secondary integrator rods, the light sources can overlap in the vertical direction to reduce the overall system height.

Also in the embodiments shown above in FIGS. 1, 3, 4 and 5, the first feeder rod and the second feeder rod have the same rod length. The length of the first feeder rod and length of the second feeder rod can be the same or can be different. Feeder rods of different lengths can be used to optimize the overall size of the illumination system. For example, in FIG. 5, the light sources are positioned on the opposite side of the feeder rods and the lengths of the feeder rods are kept short. In this configuration, the two lamps can be positioned in a partially overlap arrangement to minimize the overall height of the illumination system. Alternately, the feeder rods can be of different lengths so as to accommodate the lamps on the same side as the feeder rods. That is, the length of one feeder rod can be made longer so that the two lamps can be placed side by side. This arrangement can be useful when it is necessary to minimize the width of the illumination system.

ADVANTAGES

The illumination system of the present invention provides many advantages over conventional dual lamp illumination systems. First, the illumination system of the present invention is particularly useful in applications where a small spot size is crucial. For example, in applications where the DMD panel is very small, such as a 0.7 in. panel, a small spot size is critical to ensure high collection efficiency. The illumination system of the present invention using an elliptical reflector and a lamp with a short throw distance can realize a very small spot size for critical applications.

Second, the two lamps or light sources can be arranged to provide an optimized total input cone angle. In one embodiment, the total input cone angle of the illumination system remains at 28 degrees when two lamps are used which is the same input cone angle as the individual lamps. In conventional dual lamp systems where cutting of the reflectors is often required in order to achieve a combined light source, the cone angle for the lamps is increased. For example, in a conventional dual lamp system where the lamps are cut such that their optical axis can be rotated by 15 degrees, an increase in the input cone angle along the lamp rotation axis results. In this axis, the cone angle increase to over 40 degrees. Since the acceptable input cone angle is determined by the output aperture size, the required magnification and the required output cone angle under the law of optics, having a overly large cone angle is undesirable as light outside of the acceptable input cone angle of the illumination system cannot be collected and is wasted. In general, cutting of the reflectors is not desirable as this results in light loss due to loss of reflector area and other implementation complications.

On the other hand, the input cone angle of the illumination system of the present invention can be made optimally large to improve the light collection while not too large as to lead to inefficiency. Specifically, in the prior art dual lamp system described by Moss, a prism is used to collect and reflect light from a parabolic lamp and condenser lens arrangement. The use of the prism and the reliance on total internal reflection of the prism to direct the collected light into the integrator rod is not satisfactory as the input cone angle of the prism is only around 3 degrees. Thus, only a small amount of light from the lamp can be collected by the prism, resulting in poor efficiency. The only way to increase the input cone angle in Moss' system is to increase the distance between the condenser lens and the prism. But such measure would result in a very large spot size and further loss of light as some light would never reach the prism at all. The illumination system of the present invention using one or more feeder rods is capable of realizing an optimally large input cone angle to ensure light collection efficiency. Furthermore, the output end of the feeder rod is coated with a high index material to ensure that all the light collected in the feeder rod get reflected towards the output end.

Third, the illumination system of the present invention can achieve overall system compactness not readily realizable in prior art systems. Furthermore, simplicity in manufacturing and in lamp alignment with improved thermal management is realized. For instance, using UV/IR mirrors at 45 degrees to direct light from the light source into the respective feeder rod eliminates heating of the feeder rods from the bulb/reflector enclosure. Each lamp can thus have good airflow to achieve normal or better lamp life. Also, the arrangement of the illumination system of the present invention allows the lamps to be replaced individually and the lamps can be removed, replaced and aligned efficiently. The illumination system of the present invention simplifies the alignment of the lamps to the secondary integrator rods. In particular, all parts of the illumination system of the present invention can be fixed except an x-y coordinate lamp adjustment. Alignment of the lamps can thus be readily made.

Fourth, the illumination system of the present invention can achieve enhanced light collection over conventional dual lamp systems. By incorporating two lamps without requiring cutting of the reflectors, light loss at the lamps is minimized. The illumination system of the present invention can thus achieve equal or better brightness than conventional dual lamp systems.

Lastly, it is understood in the art that an arc lamp used as the light source must have the arc in a horizontal position with respect to the ground or the arc can extinguish or cause lamp explosion. The illumination system of the present invention allows the arc direction of the light source to be perpendicular to the projection lens optic axis. Thus, the projection lens can be tilted to realize projector tilt without causing the arc of the arc lamp to deviate from the horizontal position.

The above detailed descriptions are provided to illustrate specific embodiments of the present invention and are not intended to be limiting. Numerous modifications and variations within the scope of the present invention are possible. The present invention is defined by the appended claims.

I claim:

1. An illumination system, comprising:
a first light source and a second light source;
a first light integrating device and a second light integrating device, each light integrating device including an input aperture at an input end for receiving input light and a turning mirror at an output end for reflecting light in the light integrating device onto an output aperture, the output aperture being positioned in a direction perpendicular to the input aperture, the first light integrating device receiving input light from the first light source and the second light integrating device receiving input light from the second light source; and
a third light integrating device including an input aperture at an input end, the input aperture being optically coupled to the output apertures of the first and second light integrating devices for receiving light collected by the first and second light integrating devices, the third light integrating device providing light output at an output aperture,
wherein the first light integrating device has a first output aperture size, the second light integrating device has a second output aperture size and the third light integrating device has a third input aperture size, the third input aperture size being the total of the first and second output aperture sizes.

2. The illumination system of claim 1, further comprising:
a first reflective mirror coupled to direct the light from the first light source into the input aperture of the first light integrating device; and
a second reflective mirror coupled to direct the light from the second light source into the input aperture of the second light integrating device.

3. The illumination system of claim 2, wherein the first and second light integrating devices are positioned along a first axis, the first light source and the second light source are positioned on the same side of the first axis.

4. The illumination system of claim 2, wherein the first and second light integrating devices are positioned along a first axis, the first light source and the second light source are positioned on the opposite sides of the first axis.

5. The illumination system of claim 2, wherein the first reflective mirror and the second reflective mirror each comprises an UV/IR cold mirror.

6. The illumination system of claim 1, wherein the first light integrating device and the second light integrating device each comprises an integrator rod.

7. The illumination system of claim 6, wherein the first light integrating device comprises a first integrator rod having a first length and the second light integrating device comprises a second integrator rod having a second length, the first length being the same as the second length.

8. The illumination system of claim 6, wherein the first light integrating device comprises a first integrator rod having a first length and the second light integrating device comprises a second integrator rod having a second length, the first length being different from the second length.

9. The illumination system of claim 1, wherein the turning mirror in each of the first light integrating device and the second light integrating device comprises a metal mirror positioned at an 45° angle with respect to the output aperture of the respective light integrating device.

10. The illumination system of claim 1, wherein the turning mirror in each of the first light integrating device and the second light integrating device comprises a mirror with a reflectance of greater than 98%.

11. The illumination system of claim 1, wherein the turning mirror in each of the first light integrating device and the second light integrating device comprises a mirror with a high index dielectric coating where the index of refraction n is greater than 2.13.

12. The illumination system of claim 1, wherein the first output aperture size and the second output aperture size are each one half of the third input aperture size.

13. An illumination system, comprising:
a first light source and a second light source;
a first light integrating device including an input aperture at an input end for receiving input light from the first light source and a turning mirror at an output end for reflecting light in the first light integrating device onto an output aperture, the output aperture being positioned in a direction perpendicular to the input aperture; and
a second light integrating device including an input aperture at an input end, the input aperture being optically coupled to the output aperture of the first light integrating device for receiving light collected by the first light integrating device, the input aperture also being optically coupled to receive input light from the second light source, the second light integrating device providing light output at an output aperture, wherein the first light integrating device has a first output aperture size and the second light integrating device has a second input aperture size, the first output aperture size being smaller than the second input aperture size, and the remaining portion of the second input aperture not optically coupled to the first output aperture of the first light integrating device remains exposed.

14. The illumination system of claim 13, further comprising:
a first reflective mirror coupled to direct the light from the first light source into the input aperture of the first light integrating device.

15. The illumination system of claim 14, wherein the first reflective mirror comprises an UV/IR cold mirror.

16. The illumination system of claim 13, wherein the first light integrating device comprises an integrator rod.

17. The illumination system of claim 13, wherein the turning mirror in the first light integrating device comprises a metal mirror positioned at a 45° angle with respect to the output aperture of the first light integrating device.

18. The illumination system of claim 13, wherein the turning mirror in the first light integrating device comprises a mirror with a reflectance of greater than 98%.

19. The illumination system of claim 13, wherein the turning mirror in the first light integrating device comprises a mirror with a high index dielectric coating where the index of refraction n is greater than 2.13.

20. A method for illuminating an object, comprising:
providing a first light source;
providing a second light source;
directing light from the first light source to an input aperture of a first light integrating device;
directing light from the second light source to an input aperture of a second light integrating device;
transmitting the light through the first light integrating device to an output end of the first light integrating device;
directing the light at the output end of the first light integrating device to an output aperture, the output aperture being positioned in a direction perpendicular to the input aperture, the first light integrating device having a first output aperture size;
transmitting the light through the second light integrating device to an output end of the second light integrating device;
directing the light at the output end of the second light integrating device to an output aperture, the output aperture being positioned in a direction perpendicular to the input aperture, the second light integrating device has a second output aperture size;
coupling the light at the output aperture of the first light integrating device to an input aperture of a third light integrating device having a third input aperture size, the third input aperture size being the total of the first and second output aperture sizes;
coupling the light at the output aperture of the second light integrating device to the input aperture of the third light integrating device; and
transmitting light collected from the first and second light integrating devices through the third light integrating device.

21. The method of claim 20, wherein directing light from the first light source to an input aperture of a first light integrating device and directing light from the second light source to an input aperture of a second light integrating device each comprises:
directing light from the respective light source onto a reflective mirrors; and
reflecting the light onto the input aperture of the respective light integrating device.

22. The method of claim 20, wherein directing the light at the output end of the first light integrating device to an output aperture and directing the light at the output end of the second light integrating device to an output aperture each comprises:
providing a turning mirror at the output end of the respective light integrating device, the turning mirror operative to redirect incoming light onto a perpendicular light path; and
reflecting the light received at the input aperture and transmitted through the respective light integrating device onto the output aperture.

* * * * *